Feb. 7, 1939.  F. X. LAMB  2,146,632
SYNCHRONIZING APPARATUS
Filed Sept. 24, 1935   3 Sheets-Sheet 3

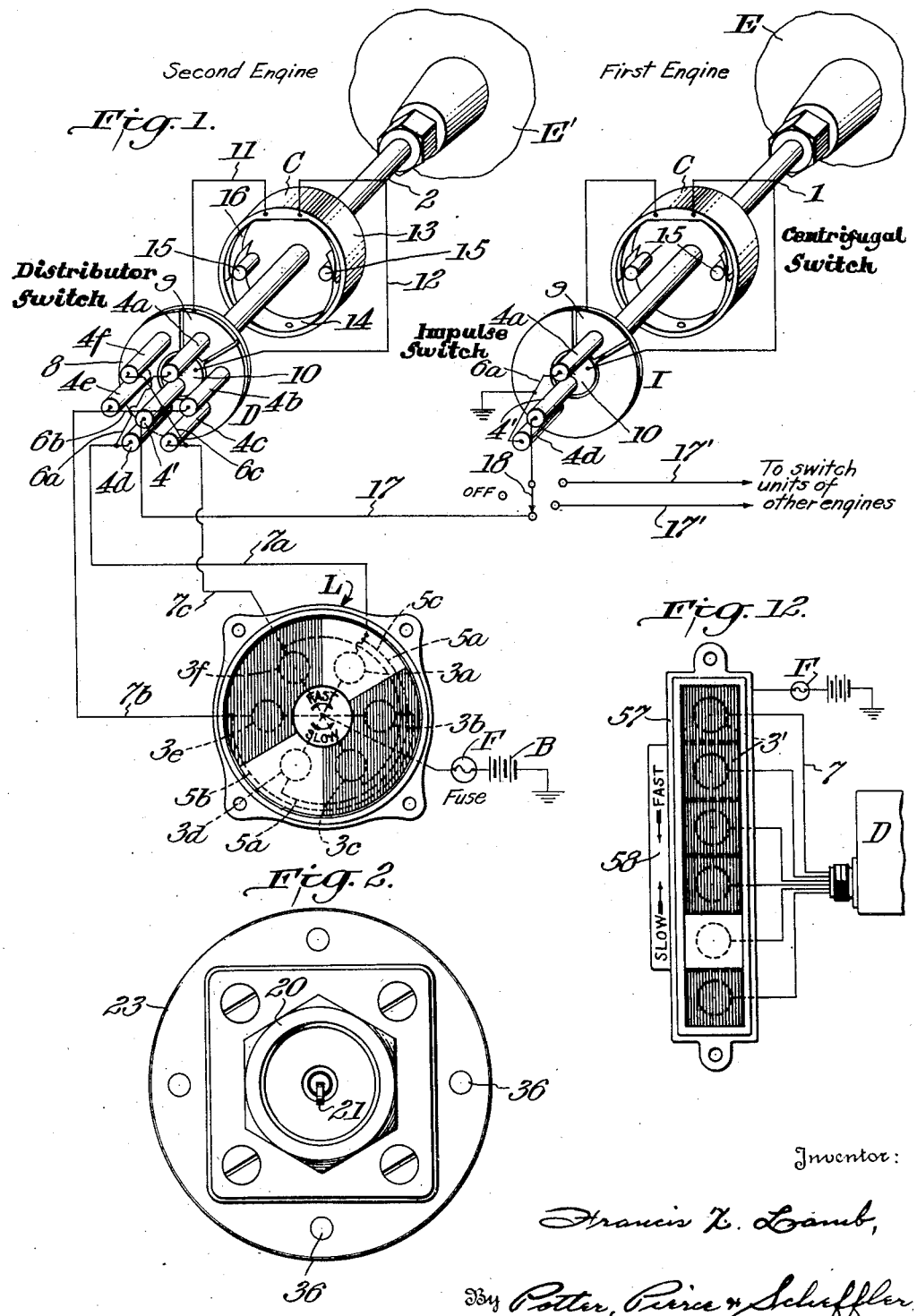

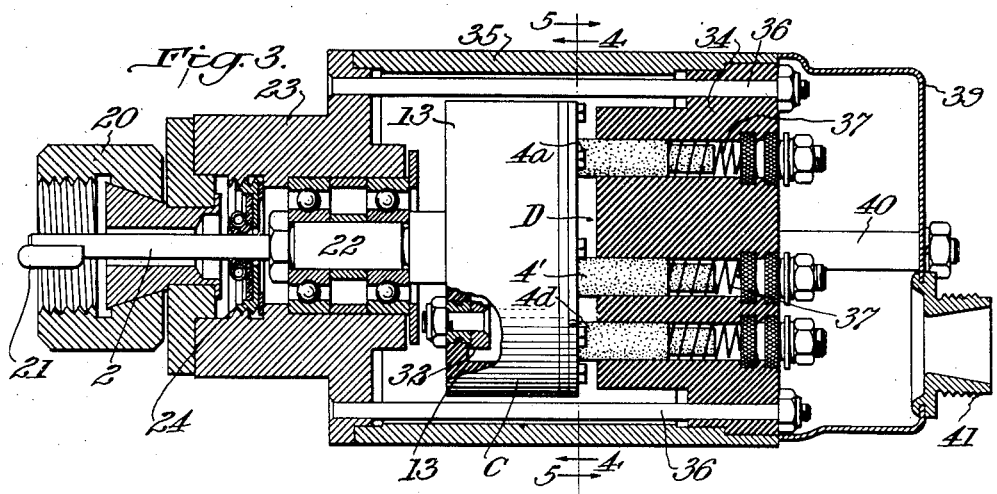

Inventor:
Francis X. Lamb,
By Potter, Pierce & Scheffler,
Attorneys.

Patented Feb. 7, 1939

2,146,632

UNITED STATES PATENT OFFICE 2,146,632

SYNCHRONIZING APPARATUS

Francis X. Lamb, East Orange, N. J., assignor to Weston Electrical Instrument Corporation, Newark, N. J., a corporation of New Jersey Application September 24, 1935, Serial No. 41,955

4 Claims. (Cl. 177—311)

This invention relates to synchronizing apparatus, and particularly to apparatus affording a visual indication of the difference in the operating speeds of two or more moving elements or rotary shafts.

Visual indicating apparatus is necessary, or at least desirable, for synchronizing elements such as, for example, aircraft engines, gears which must be engaged without clashing, belts or rolls in paper mills and other establishments. As a corollary, it is frequently desirable to determine the slip of clutches, motors or other apparatus which may or may not be capable of operation at the same speed. The invention will be described with reference to the problem of synchronizing aircraft engines, but it is to be understood that the invention is not limited to this particular use.

An object of the invention is to provide apparatus of improved and simplified design for indicating the synchronism or the relative departure from synchronism of two moving elements. An object is to provide apparatus for indicating both the sense and the amount by which the operating speed of one member differs from the operating speed of another member, the latter being assumed to be operating at a standard speed. A further object is to provide improved apparatus, including a bank of lamps, for indicating the relative rotary speeds of two shafts. More specifically, an object is to provide simple and compact synchronizing apparatus including an impulse switch adapted to be operated from the standard speed shaft, a distributing switch adapted to be operated by a second shaft, and a bank of lamps so related to the impulse and distributing switch that the same lamp or lamps are continuously energized when the shafts are synchronized, and that a lack of synchronism is indicated by the direction and speed at which the lamps of the bank are serially energized.

These and other objects and advantages of the invention will be apparent from the following specification when taken with the accompanying drawings in which:

Fig. 1 is a schematic view illustrating the electrical circuits of an embodiment of the invention;

Fig. 2 is a schematic diagram of the electrical circuits of Fig. 1, the rotary switch members being shown as linear members;

Fig. 3 is a central longitudinal section through the switch unit;

Figure 8:
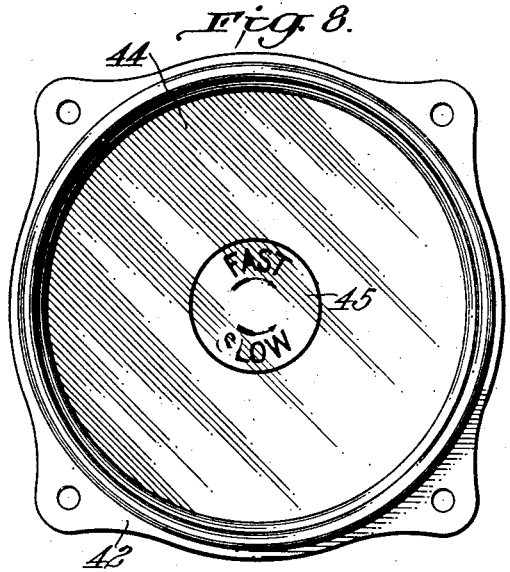
Figure 9:
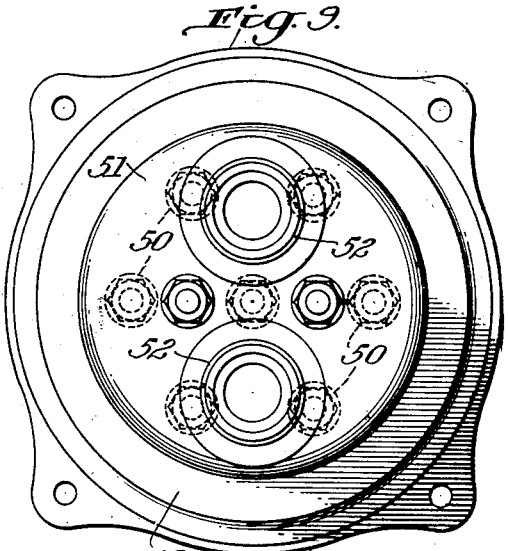
Figure 10:
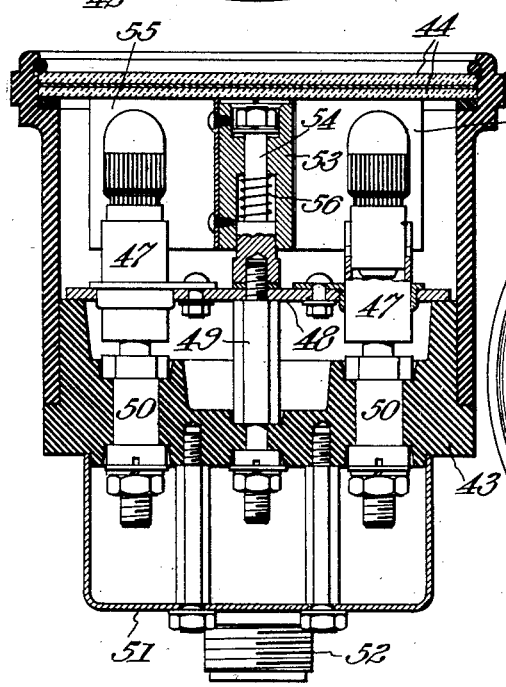
Figure 11:
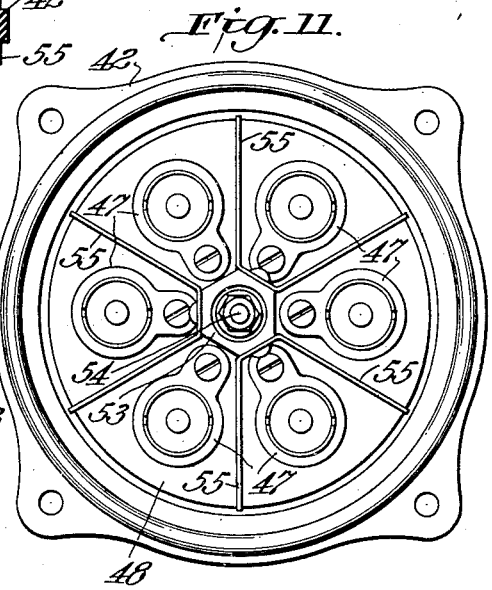

Figs. 4 and 5 are transverse sections through the same on the indicated plane and looking in the direction of arrows 4—4 and 5—5, respectively, of Fig. 3;

Fig. 6 is an end view, with the cover plate removed, of the centrifugal switch;

Fig. 7 is a central section on line 7—7 of Fig. 6;

Figs. 8 and 9 are front and rear elevations, respectively, of the annular bank of lamps;

Fig. 10 is a central section through the housing of the bank of lamps;

Fig. 11 is a front elevation of the housing of the bank of lamps as seen when the cover plate is removed; and Fig. 12 is a front elevation of another form of lamp bank.

In Fig. 1 of the drawings, the reference numeral 1 identifies the shaft of a switch unit which is connected to an engine that is assumed to be operating at the desired speed; this shaft being usually connected to the cam or timing shaft of the internal combustion engine E when the apparatus is used on a multi-motored plane. The shaft 2 of a second unit is connected to and operated from the cam shaft of a second engine E' that is to be brought into synchronism with the first engine.

The switch units which, preferably, are of identical mechanical design, include a centrifugal switch C and a second switch comprising a rotary contact member engaged by a plurality of brushes. This rotary switch I on the standard shaft closes at one or more selected points in each revolution of shaft 1 to transmit a current impulse to the rotary switch or distributer element D of shaft 2. The several brushes of the distributer element D are connected to lamps in the lamp bank L and, when the two shafts are rotating at the same speed, the current impulse transmitted to distributer D by impulse switch I will pass to the same lamp of the bank. A lack of synchronism will result in the distribution of the periodic current impulses to different lamps in accordance with the progressive changes in the position of the distributer contacts at successive current impulses.

With this brief statement of the general method of operation, the circuit connections can be most readily understood by tracing back from the lamp bank L to the impulse switch I. One set of like terminals of the series of lamps 3a, 3b, etc. are joined and connected to ground through a battery B and fuse F. The other terminals of the lamps may be individually connected to the several brushes 4a, 4b, etc., of the distributer D but, as shown in Fig. 1, the opposite lamps of the annular bank are joined by jumpers 5a, 5b, 5c, and similar jumpers 6a, 6b, 6c, respectively, connect the corresponding opposite brushes 4a, 4d; 4b, 4e; and 4c, 4f. Leads 7a, 7b and 7c extend between the correspondingly designated jumpers and, obviously, the opposite lamps of the bank will be illuminated when current is delivered to either of the pair of brushes connected to those lamps.

The distributer switch includes a large plate 8 and a small plate 9 against which the brushes bear. The smaller sector or contact plate 9 is shown, in Fig. 1, in line with the stationary contact brush 4a. Lamps 3a and 3d therefore receive the current impulse transmitted to the distributer by switch I, and this condition is indicated by the shading of lamp bank L to show that the other lamps are dark. The larger plate 8 may be of insulating material when the described jumper arrangement is employed to light two lamps simultaneously, but it is also practical to use a metal plate 8. Only two lamps will be brightly illuminated at any instant, although brushes 4b to 4f all bear upon the plate 8 and brushes 4d and 4a are connected. Lamps 3a and 3d are directly connected to the contact sector 9 through a single brush 4a, but the parallel circuit established when plate 8 is conductive includes brush 4d in series with four branch circuits each including a brush and a lamp. The resistance of this parallel circuit and the division of current flow into four branches reduces the brilliance of the four undesired lamps to a negligible value. This slight illumination of four lamps may be completely eliminated by forming the plate 8 of insulating material.

The contact sector 9 is connected to a central contact 10 of distributer D through lead 11, centrifugal switch C and lead 12. The construction of switch C will be described in detail later but, for an understanding of the circuit operation, it is sufficient to state that it includes a cup 13 carrying a contact strip 14 that is pressed outwardly by members 15, when the cup is rotated at or above a critical speed, to bridge across the contact strips 16. The function of the switch C is to prevent current flow when the engine is at rest or operating at an abnormally low speed. A contact brush 4' rests upon the central contact plate 10 and is connected by a lead 17 and the switch arm 18 to the central brush 4' of the impulse switch I. The brushes 4' are located at one side of the axis to provide a good contact with the plates 10.

As noted above, the mechanical design of the impulse switch I is preferably identical with that of the distributor switch or switches D, but only one set of diametrically opposed brushes of the impulse switch is employed in the electrical circuit. As shown in Fig. 1, brushes 4a, 4d are connected to each other and to ground through the jumper 6a. One additional brush 4b is shown to indicate the identical mechanical construction of the impulse and distributor switches, but the other unused brushes of the impulse switch are omitted for greater clearness in the illustration of the essential elements. The entire series of brushes 4a to 4f may be, and preferably is, present in each impulse switch, but only two brushes are in use. This mechanical design facilitates replacements as any switch unit may be electrically connected to serve as either an impulse or a distributor switch.

Additional leads 17' extend from contacts engageable by switch arm 18 to distributers D of other switch units when there are more than two engines or shafts to be synchronized. Contact brush 4a of the impulse switch I is connected to ground and, when switch contact 18 engages a lead 17 or 17', a circuit is completed to the lamp bank when brush 4a of switch I contacts with the plate 9. The described circuit connections result in the simultaneous lighting of two lamps at diametrically opposed points on the lamp bank. It will be apparent that jumpers of the switches and the lamp bank may be omitted and each brush individually connected to the corresponding lamp, thus resulting in the lighting of only one lamp of the bank. Such individual connections are shown in Fig. 12 which will be described later. The simultaneous lighting of two lamps has certain advantages. In the first place, there is a substantial economy since the number of leads between distributer D and lamp bank L is reduced. Furthermore, there is less flickering of the lights when the speed of the standard shaft is such that a single active brush at the impulse switch would provide less than about sixteen impulses per second. The illustrated construction was designed for use on aircraft engines and the switches are operated from the cam shafts which rotate at one-half the main shaft speed. The visual indication of a lack of synchronism is clearer at engine speeds below about 1800 R. P. M. when the jumpers are included to provide two switch closures for each lamp during a single rotation of the distributer switch.

As shown in Figs. 3 to 7, the switch unit preferably takes the form of a small, light weight assembly that is supported upon the engine solely by the threaded bushing 20 which fits upon the boss customarily provided on an airplane engine in alinement with the cam shaft. The shaft 2 of the switch unit has a key 21 which engages in a mating recess in the cam shaft when the unit is attached to the engine. Shaft 2 has an enlarged section journalled in the base 23 of the switch unit and, preferably, a dust guard 24 is provided between the end of shaft 2 and the bearing section.

The cup shaped shell of insulating material 13 is secured to the end of shaft 2, and houses the elements of the centrifugal switch C. Flexible contact strip 14 is fixed to the shell 13 by a rivet 25 and extends around approximately 180° of the inner wall of the shell. Contact strips 16 are secured to the shell or cup and have outer ends positioned adjacent but normally spaced from the ends of contact strip 14. The actuating members 15 are rods of insulating material mounted in the edges of weights 26 that are pivotally connected to a bridge member 27 on shaft 2 by pivots 28. The weights 26 are normally urged towards retracted or switch open position by springs 29 mounted on pins 30 that extend into the weights 26 and slide in grooves 31 in a radial flange 32 of shaft 2. The other ends of springs 29 engage a stud 33 fixed to the base of the cup, and the inadvertent closing of a switch contact by gravity is prevented by the bridge 27 and the sliding engagement of pins 30 in the flange 32 of shaft 2.

A head block or brush holder 34 of insulating material is mounted in spaced relation to the base 23 by a sleeve 35 and a plurality of bolts 36. The several brushes 4', 4a, etc. slide in bores in the head 34 and are held against the rotating switch plates 8, 9 by contact springs 37 which engage terminals 38 that are mounted in the head block. The terminals and cable connections are protected by a cap 39 which fits over bolts 40 carried by the head block and has a threaded bushing 41 to which the usual cable shield may be connected. The described switch construction facilitates inspection and brush replacement as the brush holder may be taken off without removing the switch assembly from the engine.

The annular lamp bank L includes a circular casing 42 having an outer flange for flush mounting on a panel and a base section 43. The glass cover plates 44 are frosted and an opaque disk 45 is placed between the cover plates, approximately centrally thereof, and bears arrows and legends indicating the sense in which the speed of the second shaft departs from the speed of the standard shaft. The several lamp sockets 47 are carried by a plate 48 which is fixed to the base 43 by a bolt 49 that serves as the common ground terminal for all lamps. The center leads to the lamp sockets are through a series of terminal members 50 that extend through base 43 and are of the type commonly used for automobile lighting. The terminal connections are enclosed within a cap 51 that has bushings 52 for receiving the cable sleeve connectors.

A sleeve 53 is slidably mounted on a central stem 54 that is fixed to bolt 49 and carries baffle plates 55 which form compartments for the several lamps. The sleeve is pressed outwardly by a spring 56 to hold the edges of the baffle plates against the ground glass cover plate 44, thus providing a sharp line of demarcation between the illuminated and the dark areas of the cover plate.

As shown in Fig. 12, the lamps may be arranged in a line, in which case the lack of synchronism is indicated by the linear movement of the lighted area or areas. The lamp casing 57 may be of appropriate design for either vertical or horizontal mounting and will carry a legend plate 58. As indicated diagrammatically, the several lamps 3' are individually connected by cable leads 7 to the corresponding brushes of the distributer switch assembly D. When it is desired to use two illuminated areas, the jumper arrangement shown in Fig. 1 may be employed to connect the opposite brushes and opposite lamps.

The lamps must be supplied with current impulses at a voltage substantially above the normal ratings of the lamps and, in general, 6 volt lamps operate satisfactorily on the 12 volt batteries usually present on aircraft. The short duration of the current impulses prevents damage to the lamps while the overvoltage provides approximately normal current flow in spite of the high resistance of the relatively cold filaments. Current flow must be restricted to momentary impulses as the lamps would be destroyed by the overvoltage. This protection is provided by the centrifugal switches which open the circuit automatically when the speed of either engine falls below a predetermined value.

As noted above, the synchronizing apparatus may be applied to fields other than that of multi-engine airplanes.

Appropriate gear ratios may be employed for driving the impulse switch and distributer switch when the members or shafts are to operate at different speeds. The number of lamps in a bank may be increased or decreased in accordance with speed of the shafts under examination and, for use with shafts rotating at relatively low speeds, a plurality of the brushes of the impulse switch may be connected in the circuit to provide a plurality of current impulses for each rotation of the impulse switch.

It will be apparent that the invention is not restricted to the exact construction of the embodiment herein illustrated and described, and that various changes may be made in the design and arrangement of the several parts without departing from the spirit of my invention as set forth in the following claims.

I claim:

1. Apparatus for indicating synchronism and of the type including an impulse switch and a multiple-contact distributer switch adapted to be actuated by high speed shafts whose speeds are to be compared, a plurality of lamps selectively connected to the contacts of said distributer switch, a source of current, a centrifugal switch adapted to be actuated by one of said shafts and having contacts and means for opening the same when the speed of the actuating shaft falls below a predetermined value, and circuit elements connecting said current source in series with the three said switches and said lamps, characterized by the fact that the voltage of said current source is substantially above the maximum voltage that may be continuously impressed upon said lamps, whereby the momentary current pulses passed by said switches to said lamps serve to raise the energized lamps substantially to normal brilliance.

2. In synchronizing apparatus for use in comparing the operating speeds of two shafts, a distributer switch adapted to be actuated by one of said shafts, said switch including a contact member and a plurality of brushes successively engaged thereby in one cycle of relative movement of said member and brushes, jumpers connecting the pairs of brushes which engage the said member at half-cycle intervals, a row of lamps having the same number of lamps as there are brushes, each lamp in the row corresponding to one of said brushes and said lamps being in sequence in the row in the order of the successive engagement of the corresponding brushes by said contact member, jumpers connecting like terminals of the pairs of lamps spaced at intervals equal to one-half the total number, connections between the several jumpers of said switch and corresponding jumpers of the row of lamps, an impulse switch adapted to be energized by the other of said shafts once for each half-cycle interval when the shafts are operating at the desired relative speeds, a source of current, and means connecting said impulse switch and current source in series with said distributer switch and said lamps.

3. Synchronization comparing apparatus as claimed in claim 2, wherein said distributer switch includes a stationary brush holder having parallel bores in which said brushes are supported, means actuated by the associated shaft for rotating said contact member, and a plate of conducting material insulated from said contact member, said plate being arranged in the plane of said contact plate.

4. Synchronization comparing apparatus as claimed in claim 2, wherein the voltage of said current source is substantially above the maximum voltage that may be continuously impressed upon said lamps, in combination with speed-actuated switch means for interrupting current flow to said lamps when the speed of one of said shafts falls below a predetermined value.

FRANCIS X. LAMB.